Figure 1:
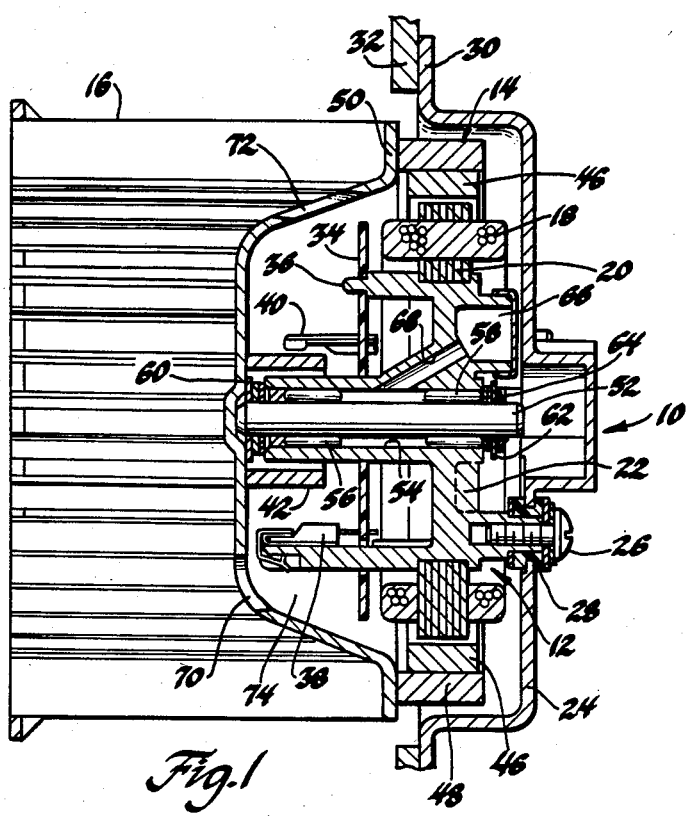

United States Patent [19]

Angi et al.

[11] Patent Number: 4,659,951
[45] Date of Patent: Apr. 21, 1987

[54] BRUSHLESS BLOWER MOTOR WITH LOAD PROPORTIONAL COOLING FOR CONTROL CIRCUITRY

[75] Inventors: Donald F. Angi, Dayton; Jack W. Savage, Centerville; Ralph D. Unterborn, Dayton, all of Ohio

[73] Assignee: General Motors Corporation, Detroit, Mich.

[21] Appl. No.: 829,488

[22] Filed: Feb. 14, 1986

[51] Int. Cl.⁴ .............................................. H02K 9/06
[52] U.S. Cl. ........................................ 310/62; 310/59; 310/60 A; 310/63; 310/67 R; 310/68 R
[58] Field of Search ...................... 310/67 R, 68 R, 58, 310/59, 62, 63, 64, 65, 89, 156, 68 D, 68 B, 60 R, 60 A

[56] References Cited

U.S. PATENT DOCUMENTS

| | | | |
|---|---|---|---|
| 3,700,358 | 10/1972 | Papst | 310/67 R |
| 3,858,069 | 12/1974 | Küter | 310/68 D |
| 4,510,409 | 4/1985 | Kanayama | 310/67 R |
| 4,536,672 | 8/1985 | Kanayama | 310/63 |
| 4,554,473 | 11/1985 | Muller | 310/68 R |
| 4,554,491 | 11/1985 | Plunkett | 310/68 R |

Primary Examiner—R. Skudy
Attorney, Agent, or Firm—Mark A. Navarre

[57] ABSTRACT

The control circuitry of a brushless blower motor is mounted on the stator of the motor and is cooled during operation of the blower by a portion of the air moved by the blower. A rotor cup member which covers and protects the control circuitry has at least a pair of radially displaced openings formed therein, and air is conveyed through the openings due to an air pressure differential therebetween created by the movement of air by the blower.

4 Claims, 3 Drawing Figures

4,659,951

BRUSHLESS BLOWER MOTOR WITH LOAD PROPORTIONAL COOLING FOR CONTROL CIRCUITRY

This invention relates to a brushless motor driven ventilation blower, and more particularly to a motor structure for cooling motor control circuitry mounted on the stator of the motor.

The control circuitry required to electronically commutate a brushless DC motor is typically mounted remote from the motor in a location where it can be adequately cooled and unaffected by motor heat. In applications where the control circuitry is mounted on or in proximity to the motor, a dedicated cooling mechanism such as a fan wheel is generally employed to provide the required heat dissipation. Dedicated, in this sense, means that the mechanism is provided primarily for the purpose of cooling the control circuitry.

The primary object of this invention is to provide a brushless motor driven blower wherein the motor control circuitry is mounted on the motor and the control circuitry is adequately cooled without the use of a dedicated cooling mechanism, and without sacrificing the air handling capability of the blower.

A further related object of this invention is to provide a brushless motor driven blower as set forth above, wherein the provided cooling is increased in direct proportion to increases in the air delivered by the blower, and therefore motor load.

The stator of the motor forms the hub of the assembly. The rotor is disposed about the stator, and the blower is secured to and at least partially disposed about the rotor. The rotor includes a smooth cup member extending inside the blower to define a substantially closed compartment between it and the stator, and the control circuitry is mounted directly on the stator within the compartment. The smooth contour of the rotor cup promotes laminar air flow within the blower thereby enhancing the blower efficiency.

The cooling of the control circuitry compartment is provided by a novel arrangement of openings in the rotor cup which effectively create a rotary pump which provides continuous circulation of fresh air through the compartment in relation to the amount of air delivered by the blower. A first set of symmetrical openings are formed in an outer radial portion of the cup, and a second set of symmetrical openings are formed in an inner radial portion of the cup. The rotation of the blower produces an air pressure gradient across the face of the rotor cup, the pressure being lowest at the innermost radial portion of the cup and highest at the outermost radial portion of the cup. Due to the pressure differential between the first and second set of openings, a fraction of the air ingested by the blower enters the first set of openings and is discharged out of the second set of openings. Since the pressure differential between the first and second set of openings increases in relation to the amount of air delivered by the blower, the amount of air pumped through the control circuitry compartment varies in direct relation to the power consumption of the motor and the heat generated by the control circuitry.

The first and second sets of rotor cup openings are relatively sized so that the cooling is not substantially restricted by either set. That is, the combined area of the first set of openings is substantially the same as the combined area of the second set, and the cooling air enters and exits the control circuitry compartment with substantially equal ease.

The primary purpose of the rotor cup is to cover and protect the control circuitry, and the cooling function is provided without the addition of dedicated cooling mechanisms.

IN THE DRAWINGS:

FIG. 1 is a cross-sectional view of the brushless motor driven ventilation blower of this invention.

Figure 2:
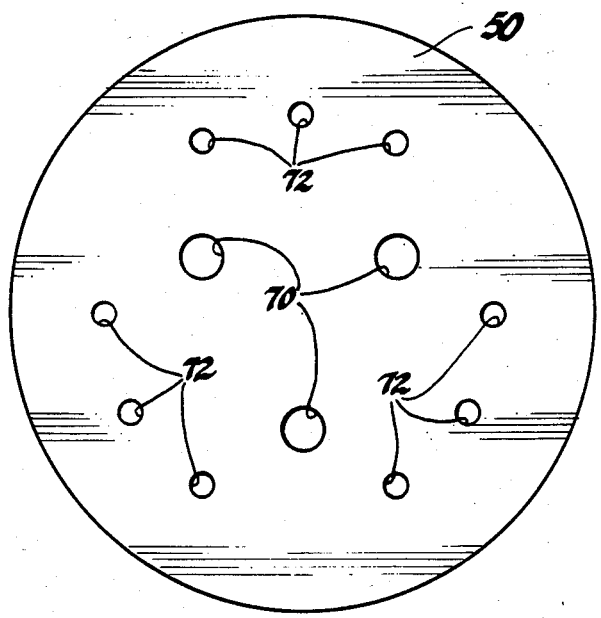

FIG. 2 details the rotor cup and the formation of the first and second sets of openings therein.

Figure 3:
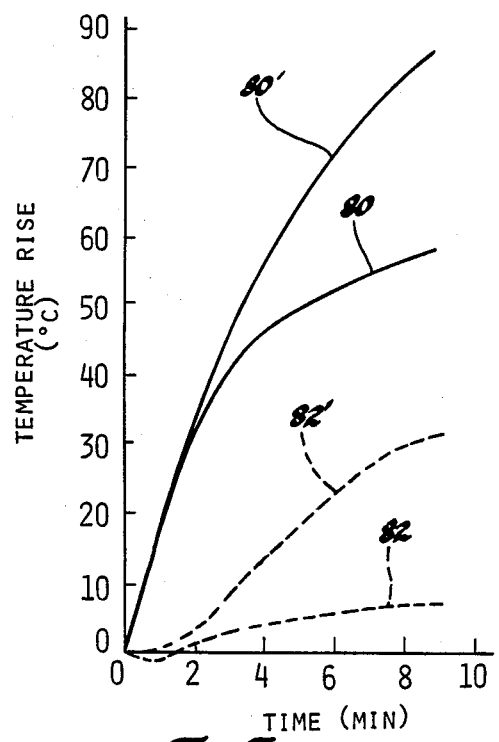

FIG. 3 graphically depicts the cooling effect provided by the air conveyed through the first and second sets of rotor cup openings according to this invention, as compared with a similar motor having only one set of openings in the rotor cup.

Referring now to the drawings, and more particularly to FIG. 1, reference numeral 10 generally designates a brushless DC motor comprising a stator assembly 12 located at the center of the motor and an annular rotor assembly 14 disposed thereabout. An annular squirrel cage blower 16 is secured to the rotor assembly 14 and adapted to be rotatably driven thereby.

The stator assembly 12 comprises a winding set 18 and laminated stator core 20 mounted on a support member 22. The support member 22, in turn, is mounted on a stator housing 24 by a plurality of screw fasteners 26. Elastomeric grommets 28 separate the stator housing 24 from the support member 22 for noise isolation. The stator housing 24 includes a peripheral flange 30 for securing the motor 10 to a stationary support member 32.

The winding set 18 is electronically commutated by a control circuit, the electronic components of which are mounted on an annular circuit board 34. The circuit board 34 is mounted on the posts 36 of support member 22 in spaced relation to the winding set 18. In practice, electronic components are mounted on both sides of the circuit board 34, permitting the entire control circuit to be included thereon. However, FIG. 1 depicts only those components critical to the motor envelope: the power transistors 38 and the Hall Effect devices 40. The power transistors 38 are strapped to the support member 22 which acts as a heat sink therefor. The Hall Effect devices 40 are positioned in relation to a phasing magnet 42 which rotates with the rotor assembly 14 as described below.

The rotor assembly 14 comprises a plurality of radially magnetized permanent magnets 46 secured to the inner periphery of a rotor flux ring 48, and axially aligned with the stator core 20. The rotor flux ring 48 is secured to a contoured rotor cup member 50, which in turn, supports the blower 16. The rotor cup member 50 is secured to a rotor shaft 52, which is received within a recess 54 of support member 22 and rotatably supported therein by the press-fit bearings 56 and 58. Thrust bearing washers 60 and 62 are retained at either end of support member 22 by the retainer ring 64. A lubricant reservoir 66 defined by a recess in the support member 22 supplies lubricating fluid to the rotor shaft 52 and the bearings 56 and 58 via the drilled passage 68 and recess 54. A phasing magnet 42 is secured to the rotor cup member 50 as indicated above, and serves in conjunction with the Hall Effect devices 40 to supply the control circuit with information concerning the position of rotor assembly 14.

The primary function of rotor cup member 50 is to cover and protect the electronic components mounted on circuit board 34 from damage due to manufacturing handling or foreign matter picked up by the blower 16. It extends into the blower annulus, and has a smooth and contoured exterior surface to promote laminar air flow therein. This increases the blower air handling capability and hence efficiency. In addition, the rotor cup member 50 is provided with at least one pair of radially displaced openings 70 and 72 within the annulus of the blower 16 which serve the advantageous function of providing a source of cooling air for the circuit board electronic components.

In operation, the rotation of blower 16 creates an air pressure gradient across the outer face of rotor cup member 50. The air pressure is lowest at the innermost radial portion of the cup member 50 and highest at the outermost radial portion of the cup member 50. As a result, there is a significant pressure differential between the radially displaced openings 70 and 72. The pressure is caused by the movement of air through the blower 16, and a fraction of such air passes through the chamber 74 defined by the stator assembly 12 and the inner surface of the rotor cup member 50. The air enters the chamber 74 via the openings 72 which are located in a relatively high pressure radial region and exits the chamber 74 via the openings 70 which are located in a relatively low pressure radial region.

The power dissipated in the electronic control circuit power transistors 38 (and other components as well) in the form of heat increases with the amount of air moved by the blower 16. However, the pressure differential across the face of rotor cup member 50, and hence the amount of cooling air circulated through the compartment 74 via openings 70 and 72 also increases with the amount of air moved by the blower 16. As a result, the ambient temperature in the compartment 74 and the actual temperature of the various circuit components are kept within safe bounds at all motor loads. Essentially, the radially displaced openings cooperate with the blower 16 to form a radial air pump which provides continuous circulation of fresh cooling air through the compartment 74 in relation to the power consumption of the motor and the heat generated by the control circuitry.

FIG. 2 illustrates how the rotor cup member 50 is formed according to the preferred embodiment of this invention. As indicated therein, the rotor cup member is made from a flat metal stamping, and then formed into the shape shown in FIG. 1. The openings 70 and 72 are defined prior to the forming of the stamping by punching out generally circular areas in two symmetric patterns as shown. The opening 70 depicted in FIG. 1 is actually but one of three symmetrically located rotor cup member openings; and the opening 72 depicted in FIG. 1 is but one of nine symmetrically located rotor cup member openings. In the process of forming the rotor cup member stamping into its final shape, the openings 70 and 72 are distorted and enlarged. The inner radial openings 70 remain generally circular, but the outer radial openings 72 become distended into a generally elliptical shape. Such distortion and enlargement during the formation of rotor cup member 50 has to be considered in specifying the initial sizing of the openings 70 and 72. Ideally, the combined area of the openings 70 after formation should be substantially the same as the combined area of the openings 72. In this way, there is no substantial restriction of the cooling air—that is, the cooling air enters and exits the compartment 74 with substantially equal ease.

FIG. 3 graphically depicts the temperature rise of the power transistors 38 and the compartment 74 in general as measured during a nine-minute full load blower test. The power transistor temperature rise during the test is given by the trace 80, and the compartment temperature rise is given by the trace 82.

Also depicted in FIG. 3 is the temperature rise as measured in a similar test with a motor having only one set of openings formed in the rotor cup member 50 such as the three inner radial openings 70 shown in FIG. 2. The power transistor temperature rise during the test is given by the trace 80', and the compartment temperature rise is given by the trace 82'. Thus, the traces 80 and 80' provide a performance comparison between the cooling apparatus of this invention and conventional cooling technology as regards the power transistors 38. Similarly, the traces 82 and 82' provide a performance comparison between the cooling apparatus of this invention and conventional cooling technology as regards the ambient temperature rise of the compartment 74. In regard to the power transistors 38, the cooling apparatus of this invention reduces the temperature rise by a factor of approximately two-thirds; in regard to the compartment 74 in which the control circuitry is mounted, the cooling apparatus of this invention reduces the temperature rise by a factor of approximately one-quarter.

In effect, this invention provides a brushless motor driven blower having an adequately cooled compartment adjacent the stator of the motor in which the motor control circuit components can be safely mounted and operated. Significantly, the air handling efficiency is increased and the cooling performance is provided at substantially no extra cost since no dedicated cooling apparatus need be provided. Moreover, the nature of the cooling effect is matched to the heat dissipation characteristics of the control circuitry in that the cooling is increased with increases in the amount of air moved by the blower.

While this invention has been described in reference to the illustrated embodiment, it will be understood that various modifications thereto will occur to those skilled in the art and that systems incorporating such modifications may fall within the scope of this invention which is defined by the appended claims.

The embodiments of the invention in which an exclusive property or privilege is claimed are defined a follows:

1. A brushless motor driven blower including a centrally disposed stator assembly, a rotor disposed about the stator assembly and supporting an annular blower for rotation therewith, a rotor cup member extending into the blower for supporting the rotor with respect to the stator and defining a protected compartment between it and an axial end of the stator assembly, and a circuit board containing motor control circuit elements mounted on the stator assembly within the protected compartment, the improvement wherein:
  two or more radially displaced openings are formed in the rotor cup member within having generally equal area the blower so that a portion of the air moved by the blower in operation thereof passes through the protected compartment to cool the motor control circuit elements due to an air pressure differential between the radially displaced openings, such pressure differential being established by the movement of air by the blower.

2. In a brushless motor driven blower including a centrally disposed stator assembly, a rotor disposed about the stator assembly and supporting an annular blower for rotation therewith, and a circuit board containing motor control circuit elements mounted on the stator assembly within the blower, the improvement comprising:

a rotor cup member extending into the blower for supporting the rotor with respect to the stator and defining a protected compartment about the circuit board and the motor control circuit elements mounted thereon, the rotor cup member having two or more radially displaced openings having generally equal area are formed therein within the blower so that a portion of the air moved by the blower in operation thereof passes through the protected compartment to cool the motor control circuit elements due to an air pressure differential between the radially displaced openings, such pressure differential being established by the movement of air by the blower.

3. The improvement set forth in claim 2, wherein the on surface of the rotor cup member is smooth and contoured, so as to promote laminar air flow within the blower, thereby to enhance the air handling capability of the blower.

4. In a brushless motor driven blower including a centrally disposed stator assembly, a rotor disposed about the stator assembly and supporting an annular blower for rotation therewith, and a circuit board containing motor control circuit elements mounted on the stator assembly within the blower, the improvement comprising:

a rotor cup member extending into the blower for supporting the rotor with respect to the stator and defining a protected compartment about the circuit board and the motor control circuit elements mounted thereon, the rotor cup member having two radially displaced sets of openings formed therein within the blower, the openings of each such set being symmetrically disposed about the rotor cup member at a substantially equal radial distance from its center, so that a fraction of the air moved by the blower in operation thereof passes through the protected compartment to cool the motor control circuit elements due to an air pressure differential between the radially displaced sets of openings, such pressure differential being established by the movement of air by the blower.

* * * * *

UNITED STATES PATENT AND TRADEMARK OFFICE
CERTIFICATE OF CORRECTION

PATENT NO. : 4,659,951

DATED : April 21, 1987

INVENTOR(S) : Donald F. Angi; Jack W. Savage; Ralph D. Unterborn

It is certified that error appears in the above-identified patent and that said Letters Patent is hereby corrected as shown below:

Column 4, Claim 1, line 62, after "openings", insert -- having generally equal area --;

lines 63-64, after "within", delete -- having generally equal area --.

Column 5, Claim 3, lines 24-25, after "wherein", delete -- the on --, and insert -- an exterior --.

Signed and Sealed this

Sixth Day of October, 1987

Attest:

DONALD J. QUIGG

*Attesting Officer*

*Commissioner of Patents and Trademarks*